April 24, 1962 A. SANDUL 3,030,725
COLLAPSIBLE FISH LANDING-NET
Filed April 22, 1960 2 Sheets-Sheet 1
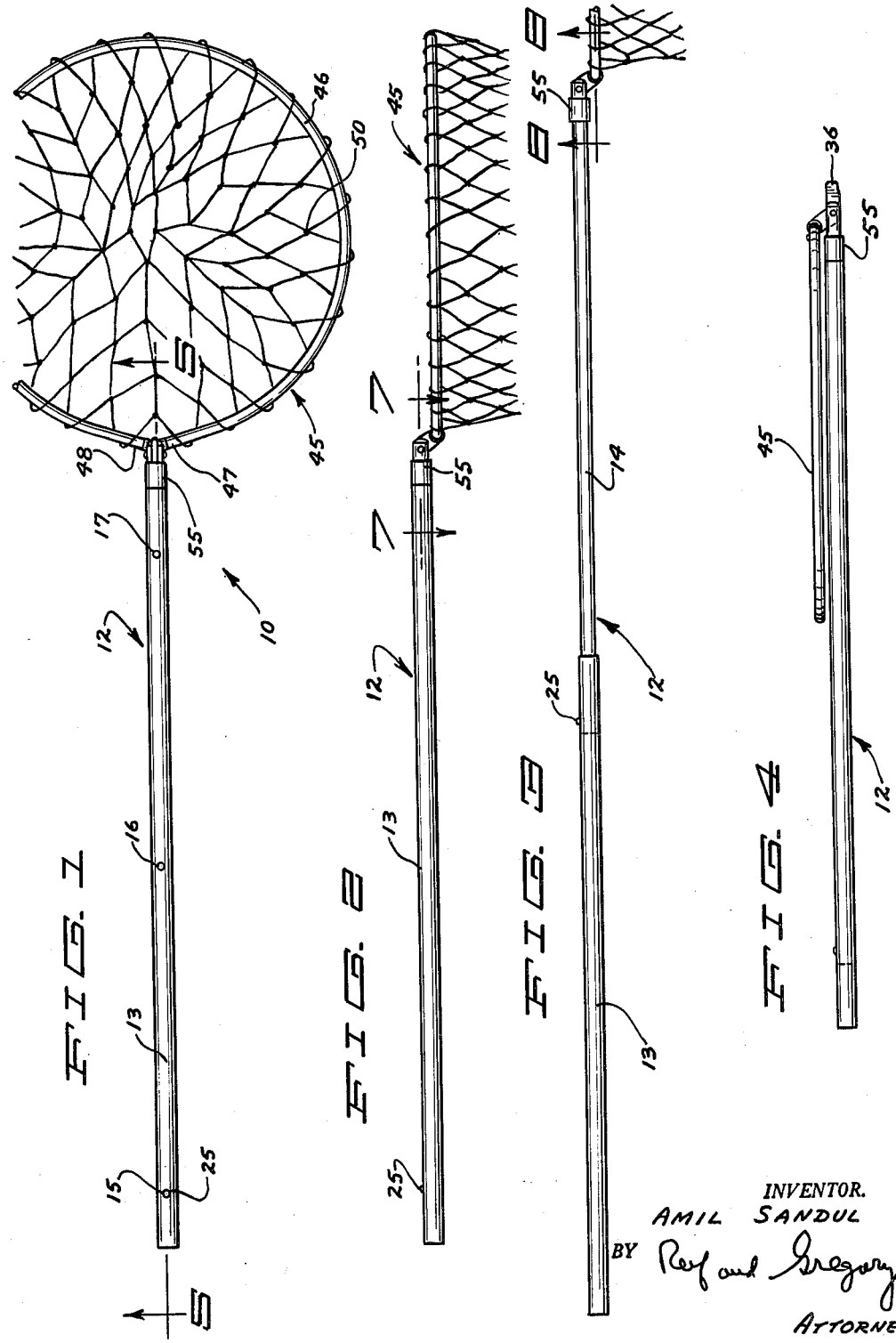
INVENTOR.
AMIL SANDUL
BY Rey and Gregory
ATTORNEYS April 24, 1962
A. SANDUL
3,030,725
COLLAPSIBLE FISH LANDING-NET
Filed April 22, 1960
2 Sheets-Sheet 2
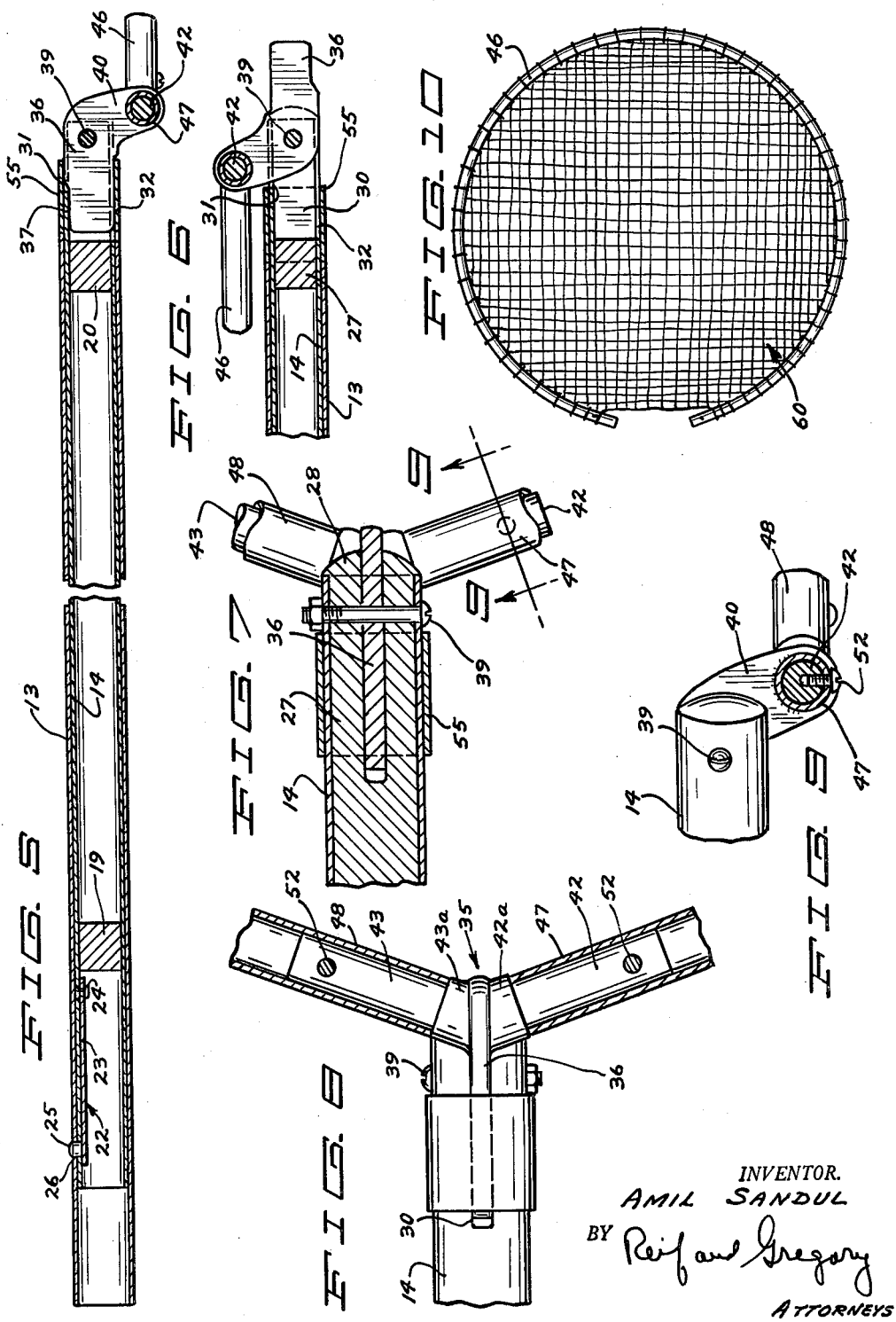
INVENTOR.
AMIL SANDUL
BY Reif and Gregory
ATTORNEYS

United States Patent Office 3,030,725
Patented Apr. 24, 1962

3,030,725
COLLAPSIBLE FISH LANDING-NET
Amil Sandul, 791 W. Montana Ave., St. Paul, Minn.
Filed Apr. 22, 1960, Ser. No. 23,980
3 Claims. (Cl. 43—12)

This invention relates to an improvement in the structure of a fish landing-net, and particularly of one collapsible into compact form for carrying and packing purposes and quickly and easily extendible into operating position.

It is an object of this invention to provide a fish landing-net having a net carrying frame pivoted to one end portion of the handle thereof and swingable from a locked horizontally extended operating position to a collapsible position overlying said handle.

It is a further object of this invention to provide a net carrying frame quickly and easily detachable for replacement of the net portion thereof or for an exchange of net carrying frames.

It is also an object of this invention to provide a telescopic handle for convenient operating adjustment, and means for making buoyant a portion of said handle.

These and other objects and advantages of the invention will be fully set forth in the following description made in connection with the accompanying drawings in which like reference characters refer to similar parts throughout the several views and in which:

FIG. 1 is a top plan view of applicant's device with a portion thereof broken away;

FIG. 2 is a view similar to FIG. 1 shown in side elevation;

FIG. 3 is a view of applicant's device in side elevation with a portion thereof in extended position and a portion being broken away;

FIG. 4 is a view of applicant's device in side elevation shown in a collapsed folded position;

FIG. 5 is a view of the handle portion of applicant's device in longitudinal vertical section on an enlarged scale;

FIG. 6 is a fragmentary view in longitudinal vertical section of a portion of the handle of applicant's device showing a portion thereof in a position different from what is shown in FIG. 5;

FIG. 7 is a fragmentary view on an enlarged scale in horizontal section taken on line 7—7 of FIG. 2 as indicaded by the arrows;

FIG. 8 is a fragmentary view on an enlarged scale in horizontal section taken on line 8—8 of FIG. 3 as indicated by the arrows;

FIG. 9 is a fragmentary view in vertical section on an enlarged scale taken on line 9—9 of FIG. 7 as indicated by the arrows; and FIG. 10 is a top plan view of a modified form of a net carrying frame.

Referring to the drawings, a fish landing-net 10 is shown comprising a handle 12. Said handle may be variously formed, but is shown here consisting of a pair of tubular rods 13 and 14. Said rods have a telescopic relationship with rod 13 being slidable over said rod 14. Spaced longitudinally of said rod 13 are apertures 15, 16 and 17.

Said rod 14 is formed having sealing plugs 19 and 20 spaced inwardly from either end thereof to provide a watertight compartment. Secured to the inner side of said rod 14 outwardly of said sealing plug 19 is a detent 22 comprising a plate-like spring member 23 secured at one end by a suitable fastening means, such as a rivet 24, and having at its other end upstanding therefrom a button-like member 25 extending through an aperture 26. Said detent 22 is adapted to engage said rod 13 through any one of its apertures 15–17 to lockingly position the same longitudinally of said rod 14.

Formed in the sides of the forward end portion of said rod 14 are diametrically opposed open-ended longitudinally extending slots 31 and 32. In the embodiment of the invention here disclosed, a cylindrical plug 27 is disposed in the end portion of said rod 14 having a convex head portion 28 of somewhat larger dimension that its body portion to overlie the end of said rod 14 and be flush therewith. Formed in said plug 27 is said slot 30 in alignment with slots 31 and 32 respectively in said rod 14, with said slot 32 having substantially greater length than said slot 31, as indicated in FIG. 5.

Adapted to be pivotally connected to said rod 14 at its slotted end portion is a yoke-like member 35 comprising a plate-like stem portion 36 adapted to be disposed in said slot 30 and having an offset upper edge portion 37 whereby the lower portion of said stem 36 is movable through the slot 32 and the upper offset portion 37 is movable within and engages the inner side of said rod 14 by extending beyond the closed inner end of the upper slot 31 in said rod 14. Extending diametrically through said rod 14 and through said plug 27 at right angles to the plane of said stem 36 is a pivot member 39 shown here in the form of a headed and nutted bolt. The forward free end portion 40 of said plate member 36 is angled downwardly to form a depending portion relative to the operating position of applicant's device. Extending angularly outwardly from either side of said depending portion 40 in a Y-like formation are a pair of oppositely extending tubular arm portions 42 and 43. Said arm portions 42 and 43 are shown here to be somewhat less in diameter than the diameters of their respective shoulder portions 42a and 43a.

Adapted to be removably secured to said yoke portion 35 is a net frame member 45 here shown to be substantially circular in form comprising an open-ended tubular ring 46 having adjacent free end portions 47 and 48. Carried on said ring 46 is a suitable net 50. Said tubular ring member 46 is of sufficient diameter to have said free end portions 47 and 48 disposed over said arm portions 42 and 43 respectively and here indicated as being flush with said shoulder portions 42a and 43a. Screws 52 will be disposed through said free end portions 47 and 48 and threaded into said arm portions 42 and 43 to removably secure said net carrying frame 45 to said yoke 35.

Slidably disposed on said rod 14 in frictional engagement therewith is a ring-like member 55 adapted to be movable to embrace the slotted end portion of said rod 14, as indicated in FIGS. 7 and 8, to lockingly enclose said stem 36.

With reference to the operation of applicant's device, it is shown in operating position in FIGS. 1 and 2, and in collapsed position in FIG. 4. Starting with said device in its collapsed position, the ring 55 will be moved somewhat rearwardly of the slot 30. The rod 14 will be held with the shorter slot 31 uppermost. The net carrying frame 45 will be swung outwardly into a longitudinally extended position relative to said rod 14 and the stem 36 will be moved upwardly into the slot 30 with the offset portion 37 engaging the inner side of the rod 14 inwardly of the shorter slot 31. Thus normally applicant's device is placed in operating position by merely swinging the net carrying frame 45 through 180 degrees. The ring 55 will be moved forwardly to enclose the stem 36 and thus lock it in the slot 30 so that applicant's device will remain in this operating position even when turned through 180 degrees, which will result in the longer slot 32 being uppermost. Said ring is frictionally held in any given longitudinal position of said rod. Thus it is seen that it is not necessary to hold the net carrying frame 45 in an extended position until the ring 55 is moved forwardly to its locking position. Applicant's device is so constructed that the net carrying frame 45 will be held in extended operating position when the short slot 31 is in an upper position.

Said rod 14 with a sealing plug adjacent either end thereof forming an air chamber therein has a buoyant characteristic so that if it is inadvertently dropped into a body of water, it will float sufficiently to be easily recovered. The outer and extendible rod 13 in connection with said detent 22 may be locked in any desired of three positions with said detent 22 engaging the apertures 15, 16 or 17. With the rod 13 in its innermost position, as indicated in FIG. 1, it butts up against the ring 55 to additionally hold it in position. Said ring 55 as hereinbefore indicated is formed to have sufficient frictional engagement with said rod 14 and with said stem 36 to be adequately held in any given position.

If it is desired to change the net carrying frame 45 and to substitute therefor a modified form or a different form of a net carrying frame, such as the net carrying frame 60 having a finer mesh net in connection therewith, there is an easy exchange of said net carrying frames by simply removing the screws 52 and disengaging the free ends of the net carrying frame from the arm portions 42 and 43.

Thus it is seen that I have provided a simply constructed fish landing-net providing for an easy removal of the net carrying frame for an exchange of such frames or for replacement of the net portion thereof and further providing a simply operated pivotal association between the net carrying frame and the handle portion thereof whereby the net carrying frame can be positioned in extended operating position or pivoted to overlie the handle portion for easy handling and carrying of the device.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A fish landing-net structure comprising an elongated tubular handle, a cylindrical plug at one end portion of said handle, a diametrical slot in said plug, a slot in said handle open at said end and at one side of said handle in communication with said slot in said plug, a substantially Y-shaped member having a plate-like stem portion disposable in said slot, said stem portion normally disposable in a vertical plane and having a portion thereof angled downwardly with reference to its normal operating position, arm portions extending oppositely angularly in relation to said depending portion, means for pivotally securing said stem portion in said slotted portion of said handle, a net carrying frame having free end portions constructed to be removably secured to said extended arm portions, and a ring frictionally slidable on said handle to embrace said slotted portion and said stem portion therein to lockingly enclose said stem portion to hold said net carrying frame portion in extended operating position.

2. The structure set forth in claim 1, said tubular handle being sealed adjacent either end thereof to form an air chamber therein.

3. The structure set forth in claim 1, a second tubular handle slidable on said first handle, and means for holding said second handle in certain different extended positions relative to said first handle.

References Cited in the file of this patent

UNITED STATES PATENTS

| 1,839,958 | Erickson | Jan. 5, 1932 |
| 2,549,573 | Clark | Apr. 17, 1951 |
| 2,683,321 | Faber | July 13, 1954 |

FOREIGN PATENTS

| 4,908 | Great Britain | 1891 |